United States Patent Office.

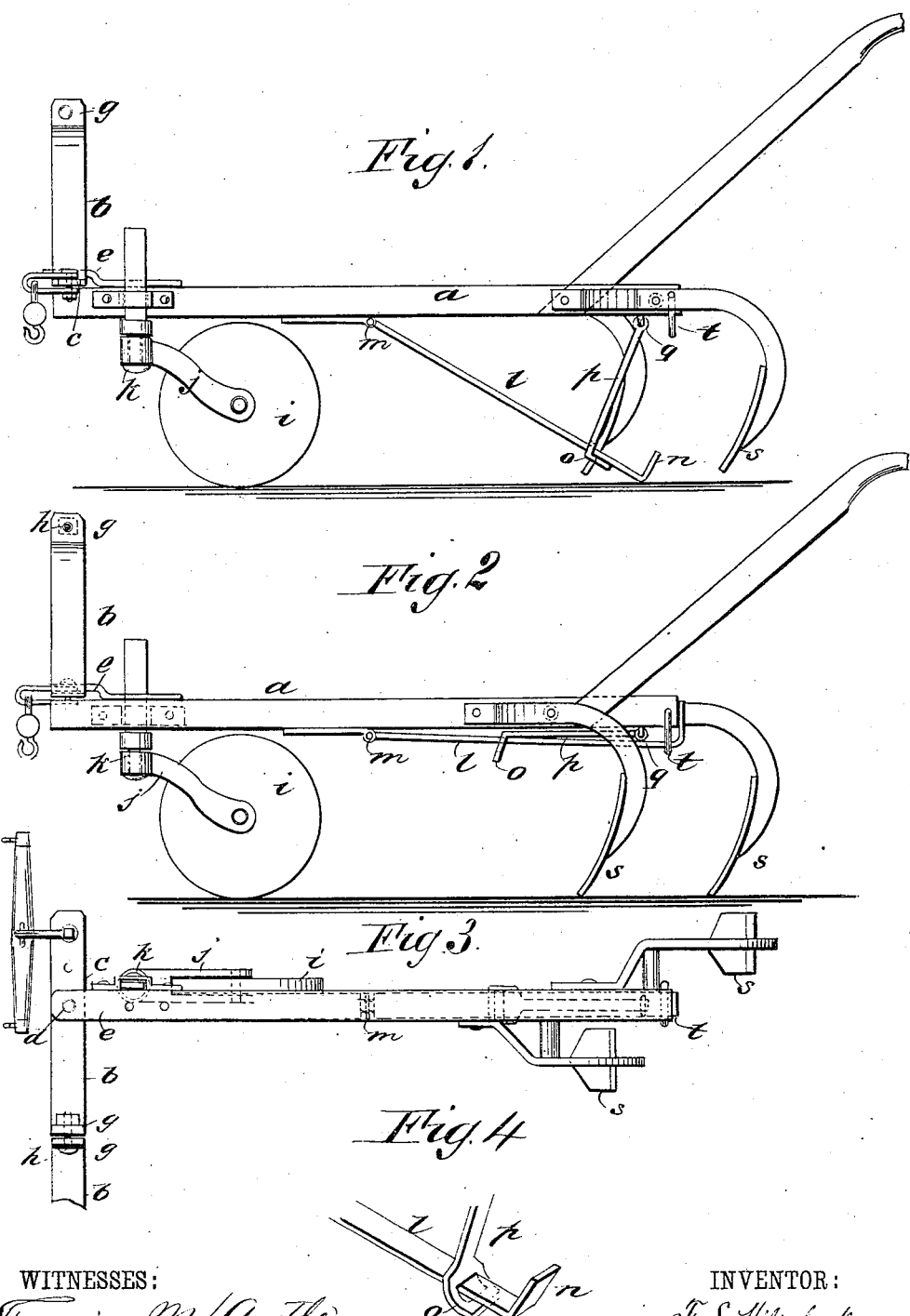

FREDERICK LAWRANCE HILSABECK, OF SHELBYVILLE, ILLINOIS, ASSIGNOR TO HIMSELF AND JAMES WARD, OF SAME PLACE.

CULTIVATOR.

SPECIFICATION forming part of Letters Patent No. 291,730, dated January 8, 1884.

Application filed October 6, 1883. (No model.)

*To all whom it may concern:*

Be it known that I, FREDERICK L. HILSABECK, of Shelbyville, in the county of Shelby and State of Illinois, have invented a new and Improved Cultivator, of which the following is a full, clear, and exact description.

The object of the invention is to improve that class of cultivators which are used for working on both sides of a row of plants.

Reference is to be had to the accompanying drawings, forming part of this specification, in which similar letters of reference indicate corresponding parts in all the figures.

Figure 1 is a side elevation of a cultivator provided with my improvements, and being adjusted on the runner for carrying the plows over ground. Fig. 2 is a side elevation, showing the running device hitched up under the beam when the cultivator is to be used. Fig. 3 is a plan view of one cultivator and the coupling-arch, and Fig. 4 is a detail of the runner device.

For coupling the beams $a$ of a couple of cultivators to be hitched to a pair of horses and worked on both sides of a row of plants, or side by side for any purpose, I make an arch-bar consisting of two sections, $b$, which have a horizontal projection, $c$, of one end for coupling to the beam by a pin, $d$, under the guard $e$, and which bow upward between the beams to the crown of the arch, where they meet together by the angle lugs or flanges $g$, which are secured together by a pivot-bolt, $h$, which attaches them together suitably for connecting the cultivators, and at the same time allows the requisite vertical play of each independently of the other for the proper working of the cultivators on uneven ground.

I connect the guide-wheel $i$ to the beam $a$ by a caster-wheel forked stock, $j$, and pivot $k$, to enable the beam to swing on the wheel, and the wheel to swing on its pivot when turning the cultivators about, in a way to avoid the turning of the cultivator over sidewise, which a guide-wheel attached to a vertical stock causes if the beam and wheel are not raised above the ground by bearing down on the handles, which it is not always convenient to do.

For a runner device on which the cultivator may ride to carry the plows above ground, I connect the flat bar $l$ to the under side of the beam by a hinge-joint, $m$, at the middle of the beam, or thereabout, said plate reaching therefrom to the rear end of the beam, and having the end $n$ passed through the curved end $o$ of a bar, $p$, and bent upward at a right angle, or thereabout, to prevent said bar $p$ from slipping off from bar $l$. The bar $p$ is pivoted to the under side of the beam $a$ at $q$, so that when bar $l$ is let fall from the beam, both of said bars will swing down to the ground and form a runner device of a little greater height than the plows $s$, which will be raised above the ground by said runner and be carried therein, the bar $p$ forming a strut on which the cultivator is lifted, and the bar $l$ forming the rest for the strut. The yoke $t$ at the rear end of the beam is employed to suspend said runner device above the ground by swinging under the end of bar $l$, to hang it up, and said bar $l$ holds up the bar $p$, as clearly represented in Fig. 2.

Having thus described my invention, I claim as new and desire to secure by Letters Patent—

1. The combination, with the beam $a$, of the two bars $l$ $p$, the former passing through a hole near the end $o$ of the latter, as shown and described.

2. The supporting device having its bars $l$ $p$ hinged at $m$ $q$ to the beam, one passing through a slot at the angle end $o$ of the other, to enable said bars to be swung up or down together, as described.

FREDERICK LAWRANCE HILSABECK.

Witnesses:
E. E. WAGGONER,
W. B. JACKSON.